US012704411B2

(12) United States Patent
Willis et al.

(10) Patent No.: US 12,704,411 B2
(45) Date of Patent: Aug. 11, 2026

(54) DELTA E FORMULA MATCH PREDICTION

(71) Applicant: X-RITE, INCORPORATED, Grand Rapids, MI (US)

(72) Inventors: Robert Willis, Greensboro, NC (US); Thomas Michaels, Grand Rapids, MI (US)

(73) Assignee: X-RITE INCORPORATED, Grand Rapids, MI (US)

( * ) Notice: Subject to any disclaimer, the term of this patent is extended or adjusted under 35 U.S.C. 154(b) by 1144 days.

(21) Appl. No.: 17/770,564

(22) PCT Filed: Oct. 26, 2020

(86) PCT No.: PCT/US2020/057355

§ 371 (c)(1),
(2) Date: Apr. 20, 2022

(87) PCT Pub. No.: WO2021/081496

PCT Pub. Date: Apr. 29, 2021

(65) Prior Publication Data

US 2022/0390282 A1 Dec. 8, 2022

(30) Foreign Application Priority Data

Oct. 25, 2019 (EP) .................................... 19205482

(51) Int. Cl.

*G01J 3/46* (2006.01)
*G06N 5/04* (2023.01)
*G06Q 10/04* (2023.01)

(52) U.S. Cl.

CPC ................ *G01J 3/463* (2013.01); *G06N 5/04* (2013.01); *G01J 2003/466* (2013.01); *G06Q 10/04* (2013.01)

(58) Field of Classification Search

CPC ...... G01J 3/463; G01J 2003/466; G06N 5/04; G06Q 10/04

See application file for complete search history.

(56) References Cited

U.S. PATENT DOCUMENTS 5,740,078 A * 4/1998 Cheetam ................ G01J 3/463 356/402
6,483,607 B1 * 11/2002 Van de Capelle ..... G01N 33/32 358/1.9

(Continued)

FOREIGN PATENT DOCUMENTS

WO 2018204639 11/2018

OTHER PUBLICATIONS

International Preliminary Report on Patentability regarding PCT/US2020/057355, dated May 5, 2022 (9 pgs.).

(Continued)

*Primary Examiner* — Andrew T Chiusano
(74) *Attorney, Agent, or Firm* — Hahn Loeser & Parks, LLP

(57) ABSTRACT

A method of determining a color formula for a target color begins with generating a plurality of candidate color formulas to reproduce the target color. For each candidate formula, a predicted delta E indicating a difference from a predicted color for the candidate formula from the target color is determined. Also for each candidate formula, a confidence value in the predicted delta E is generated by summing weighted figures of merit for each colorant in the candidate formula. The weighting of the figures of merit represents each colorant's proportion in the candidate formula. A formula is then selected based on the predicted delta E and confidence value. The target color may be defined in terms of a multi-dimensional color space.

14 Claims, 4 Drawing Sheets

(56) References Cited

U.S. PATENT DOCUMENTS

| | | | | |
|---|---|---|---|---|
| 8,027,038 | B2 | 9/2011 | Jung et al. | |
| 8,891,875 | B2 | 11/2014 | Del Amo et al. | |
| 2003/0172477 | A1* | 9/2003 | McDonald | C09B 67/0033 8/658 |
| 2003/0223060 | A1* | 12/2003 | Graf | G01J 3/504 356/319 |
| 2005/0128484 | A1* | 6/2005 | Rodrigues | G06T 11/001 356/402 |
| 2008/0052023 | A1* | 2/2008 | Kettler | G01J 3/465 702/82 |
| 2014/0278254 | A1* | 9/2014 | Beymore | G06N 7/01 702/189 |
| 2016/0057399 | A1 | 2/2016 | Holub | |
| 2017/0374234 | A1 | 12/2017 | Leskanic et al. | |
| 2020/0314290 | A1* | 10/2020 | Yokouchi | H04N 1/54 |

OTHER PUBLICATIONS

Mokrzycki et al. "Colour difference Delta E—A survey," Machine Graphic & Vision, Aug, 8, 2017, [retrieved on Dec. 14, 2020). Retrieved from the Internet: <URL: https://wisotop.de/assets/2017/DeltaE-%20Survey-2.pdf> pp. 1-29.

International Search Report regarding PCT/US2020/057355, dated Jan. 21, 2021(2 pgs.).

Written Opinion of the International Searching Authority regarding PCT/US2020/057355, dated Jan. 21, 2021 (7 pgs.).

* cited by examiner

Table 1

| | | Predicted Performance | | | | pΔE=0.28 pSD=0.16 | | |
|---|---|---|---|---|---|---|---|---|
| Name | Conc | %STR---SUM | ΔE | DL* | DC* | DH* | Ext ΔE | Opacity_CR |
| 22 | 18.0000 | 99.7524 | 0.18 | 0.14 | 0.26 | -0.15 | 0.12 | 99.39 |
| 23 | 8.0000 | 99.5183 | 0.25 | -0.18 | -0.42 | -0.24 | 0.81 | 87.84 |
| 24 | 1.0000 | 98.3768 | 0.17 | 0.14 | -0.06 | 0.15 | 0.13 | 97.91 |
| 25 | 5.0000 | 101.8279 | 0.17 | -0.02 | 0.44 | 0.11 | 0.17 | 99.49 |
| 26 | 9.0000 | 101.9058 | 0.15 | -0.06 | 0.41 | 0.08 | 0.16 | 99.58 |
| 27 | 13.0000 | 101.1531 | 0.09 | -0.03 | 0.25 | 0.06 | 0.10 | 99.70 |
| 28 | 17.0000 | 100.5211 | 0.14 | 0.09 | 0.35 | -0.06 | 0.10 | 99.56 |
| 29 | 14.0000 | 99.0321 | 0.36 | 0.31 | 0.42 | -0.08 | 0.35 | 99.94 |
| 30 | 5.0000 | 97.9600 | 0.26 | 0.30 | 0.01 | 0.04 | 0.24 | 98.39 |
| 2a | 8.0000 | 96.1693 | 0.86 | 0.77 | 0.75 | -0.16 | 0.84 | 100.00 |
| 2b | 4.0000 | 97.8847 | 0.40 | 0.38 | 0.18 | 0.02 | 0.40 | 99.98 |

Fig. 3

Figure 4:
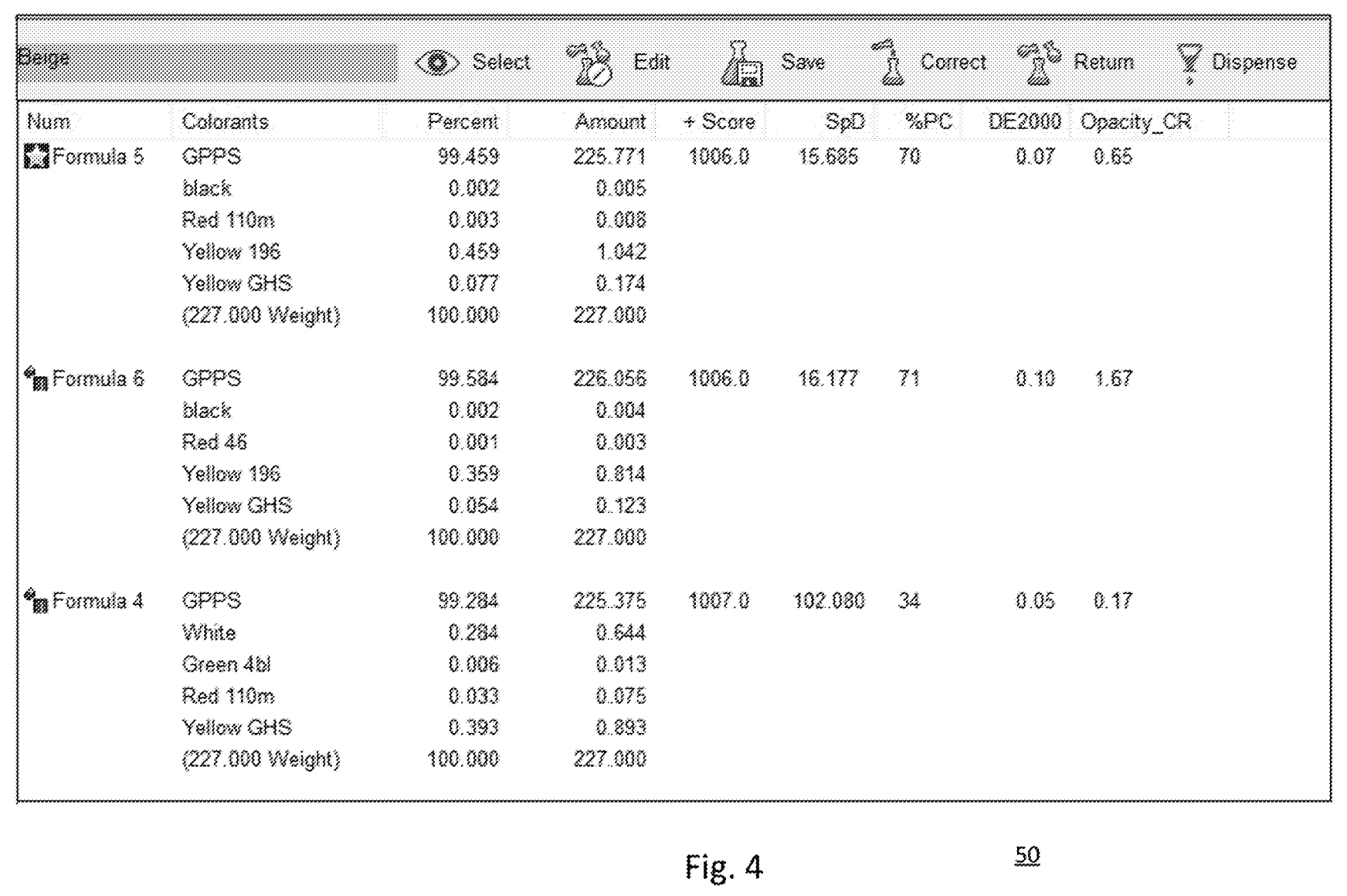

Beige

Select Edit Save Correct Return Dispense

| Num | Colorants | Percent | Amount | + Score | SpD | %PC | DE2000 | Opacity_CR |
|---|---|---|---|---|---|---|---|---|
| Formula 5 | GPPS | 99.459 | 225.771 | 1006.0 | 15.685 | 70 | 0.07 | 0.65 |
| | black | 0.002 | 0.005 | | | | | |
| | Red 110m | 0.003 | 0.008 | | | | | |
| | Yellow 196 | 0.459 | 1.042 | | | | | |
| | Yellow GHS | 0.077 | 0.174 | | | | | |
| | (227.000 Weight) | 100.000 | 227.000 | | | | | |
| Formula 6 | GPPS | 99.584 | 226.056 | 1006.0 | 16.177 | 71 | 0.10 | 1.67 |
| | black | 0.002 | 0.004 | | | | | |
| | Red 46 | 0.001 | 0.003 | | | | | |
| | Yellow 196 | 0.359 | 0.814 | | | | | |
| | Yellow GHS | 0.054 | 0.123 | | | | | |
| | (227.000 Weight) | 100.000 | 227.000 | | | | | |
| Formula 4 | GPPS | 99.284 | 225.375 | 1007.0 | 102.080 | 34 | 0.05 | 0.17 |
| | White | 0.284 | 0.644 | | | | | |
| | Green 4bl | 0.006 | 0.013 | | | | | |
| | Red 110m | 0.033 | 0.075 | | | | | |
| | Yellow GHS | 0.393 | 0.893 | | | | | |
| | (227.000 Weight) | 100.000 | 227.000 | | | | | |

DELTA E FORMULA MATCH PREDICTION

RELATED APPLICATIONS

This application claims benefit from EP Application No. 19205482.3, filed Oct. 25, 2019, and PCT/US2020/057355, filed Oct. 26, 2020, the disclosures of which are incorporated by reference.

BACKGROUND

Developing color recipes for inks, coatings, plastics, etcetera often involves using formulation software including a color formulation engine. The color formulation engine uses characterization data of various colorants, ink bases and substrates (in the graphic arts) or other colorant/base information (in other arts, such as coatings, plastics, textiles). The characterization data provides information concerning how each ingredient "behaves" when combined in an ink or other color product.

Generating characterization data typically occurs as follows. A user prepares samples of a colorant or mixtures of a colorant with base, white, and/or black constituent components at various concentration levels. The user measures reflectance and/or transmission properties of each sample to obtain spectral and other measurements. Multiple samples at each concentration may also be prepared and measured to assess colorant and/or process consistency. The reflectance/transmission measurements are then input into a color formulation engine, such as Color iMatch, available from X-Rite Inc. The color formulation engine generates characterization data for each colorant and base from the measured samples. The characterization data may comprise K (absorption) and S (scatter) values or derivatives. This process is repeated for additional colorants which can be combined in the various concentrations to produce a gamut of colors. A collection of such colorants with their characterization data is referred to as an EFX Collection.

A target color is identified, then the target color is selected or input into the color match engine. The color formulator engine then generates one or more formulas in an attempt to match the target color spectral reflectance curve. Evaluation of predicted formulas are traditionally done by calculating a difference between the spectral curve of the desired target color and the theoretical spectral curve of the predicted formula. This difference is referred to as "Delta E" or ΔE. Methods for calculating ΔE are well known in the art.

In practice, the actual delta E of a mixed formula often differs from the predicted delta E. One reason for inaccurate ΔE calculations is that the characterization data may have insufficient data points, such as insufficient colorant density samples, (causing interpolation errors) or insufficient samples at a given density (affecting repeatability).

Inaccurate ΔE predictions are problematic because users of color matching engines are capable of generating large numbers of potential formulas for a given target color, and to deal with the large numbers of formulas, users often rank formulas by ΔE. Users may then formulate test samples of the formulas having the closest ΔE match, believing that a lower ΔE implies a greater likelihood of a match. However, formulas relying on poor characterization data may rank well on ΔE, but provide poor results when formulated, resulting in added costs and delays.

SUMMARY

A method of determining a color formulation for a target color begins with generating a plurality of candidate color formulas to reproduce the target color. For each candidate formulas, a predicted delta E indicating a difference from a predicted color for the candidate formulas from the target color is determined. Also for each candidate formulas, a confidence value in the predicted delta E is generated by summing weighted figures of merit for each colorant in the candidate formulas. The weighting of the figures of merit represents each colorant's proportion in the candidate formulas. A formulas is then selected based on the predicted delta E and confidence value. The target color may be defined in terms of a multi-dimensional color space.

The figure of merit may comprise an average standard deviation (pSD) of a colorant's predicted spectral response relative to spectral measurements of samples of the colorant, where the samples are prepared at different colorant concentrations. The pSD for each colorant may be obtained by: obtaining spectral measurements for a plurality of samples made with the colorant at different colorant concentrations; generating a plurality of formulas by generating at least one formulas to match the spectral measurement of each sample; generating a predicted spectral response for each formulas; and determining an average standard deviation between the predicted spectral responses of the formulations and the spectral measurements of the samples.

The confidence value may be generated by: determining a percentage of each colorant in the candidate formula; multiplying each colorant's pSD by its percentage in the formula to obtain a weighted pSD for each colorant; summing the weighted pSDs; and expressing the sum of the weighted pSDs as a percentage confidence.

In another method, the figure of merit comprises an average delta E (pΔE) of a colorant's predicted color relative to spectral measurements of the colorant's samples.

In another aspect of the present invention, a system for determining a color formula for a target color is provided, the system including a computing device having non-volatile instructions that, when executed by a processor, cause the computing device to generate a plurality of candidate color formulas to reproduce the target color. The computing device further performs the steps of: for each candidate formula, determine a predicted delta E indicating a difference from a predicted color for the candidate formula from the target color; for each candidate formula, generate a confidence value in the predicted delta E by summing weighted figures of merit for each colorant in the candidate formula, wherein the weighting of the figures of merit represents each colorant's proportion in the candidate formula; and selecting a formula based on the predicted delta E and confidence value.

BRIEF DESCRIPTION OF THE DRAWINGS

FIG. 3 is a table including a characterization data of a colorant at various concentrations and calculated figures of merit for the colorant according to another aspect of the present invention.

FIG. 4 is a user visible display according to another aspect of the present invention.

DETAILED DESCRIPTION

Figure 1:
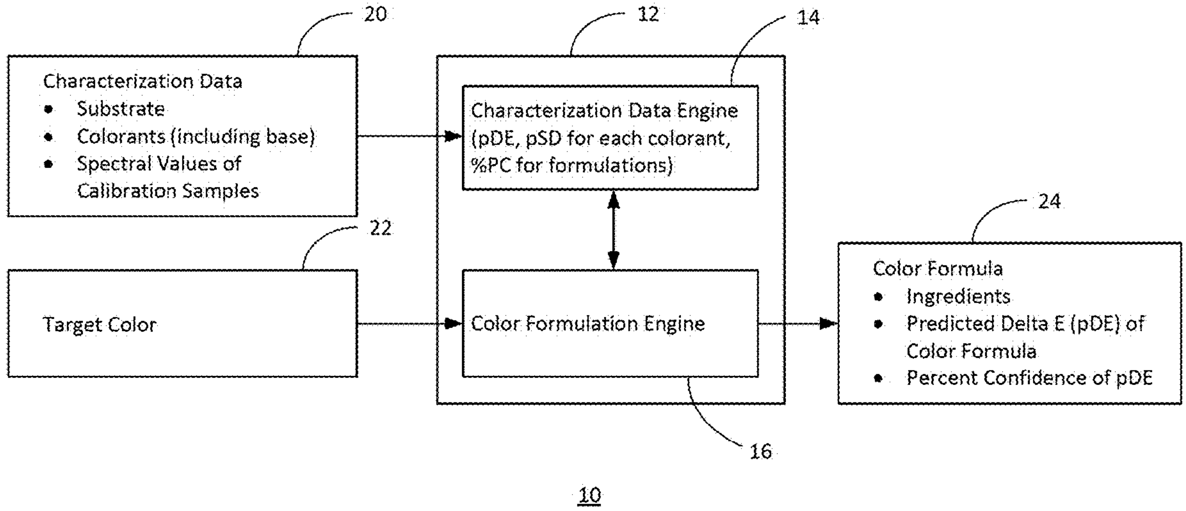
FIG. 1 is a block diagram of a system according to one aspect of the present invention.

In the present disclosure, references in the singular may also include the plural. Specifically, the word "a" or "an" may refer to one, or one or more, unless the context indicates otherwise.

One aspect of visual appearance is color. The "color" of an object is determined by the parts of the spectrum of incident white light that are reflected or transmitted to an observer without being absorbed. The color of an object can be described by "color attributes". In general terms, color attributes are indicative of the spectral response of the object when it is illuminated by incident light. In the context of the present disclosure, the term "color attribute" is to be understood broadly as encompassing any form of data that is indicative of the spectral response of an object when it is illuminated by incident light. Color attributes can take the form of color values in an arbitrary color space, e.g. in a trichromatic color space like RGB or CIEXYZ, or in any other color space like CIELAB (L*a*b*) or CIE L*C*h, or in the form of spectral data representative of a spectral response of a material to incident light, in arbitrary format. In the context of the present disclosure, color attributes may in particular include absorption and scattering coefficients of a material at a plurality of wavelengths.

The term "colorant" is to be understood as a constituent of a material that provides the appearance of color when light it reflected from it or transmitted through it. Colorants include inks, pigments and dyes. A "pigment" is a colorant that is usually insoluble in a base constituent material. A pigment can be from natural or synthetic sources. A pigment can comprise organic and inorganic constituents. A "dye" is a colorant that is usually soluble in a base constituent material.

The term "formula" is to be understood as relating to a collection of information that determines how an ink or other material is to be prepared. The material may comprise a coating material, such as automotive paint, a solid material, such as plastic materials, a semi-solid material, such as gels, an ink for being applied to a printing substrate, combinations of inks and printing substrates, and combinations thereof. The recipe includes, in particular, the concentrations of the constituents of which the material is composed, such as a base and colorants. A material that has been prepared according to a formula may also be called a "formulation".

The term "database" refers to an organized collection of data that can be accessed electronically by a computer system. In simple embodiments, the database can be a searchable electronic file in an arbitrary format. Examples include a Microsoft Excel™ spreadsheet or a searchable PDF document. In more sophisticated embodiments, a database can be a relational database that is maintained by a relational database management system using a language like SQL.

The term "computer" or "computing device" refers to any device that can be instructed to carry out sequences of arithmetic or logical operations automatically via a program. Without limitation, a computer can take the form of a desktop computer, a notebook computer, a tablet computer, a smartphone, a programmable digital signal processor etc. A computer generally includes at least one processor and at least one memory device. A computer may be a subunit of another device, such as an appearance capture device. A computer may configured to establish a wired or wireless connection to another computer, including a computer for querying a database. A computer can be configured to be coupled to a data input device like a keyboard or a computer mouse or to a data output device like a display or a printer via a wired or wireless connection.

A "computer system" is to be broadly understood as encompassing one or more computers. If the computer system comprises more than one computer, these computers do not necessarily need to be at the same location. The computers within a computer system may communicate with one another via wired or wireless connections.

A "processor" is an electronic circuit which performs operations on an external data source, in particular, a memory device.

A "memory device" or briefly "memory" is a device that is used to store information for use by the processor. The memory device may include volatile memory, as for random-access memory (RAM), and nonvolatile memory, as for read-only memory (ROM). In some embodiments, the memory device may include a non-volatile semiconductor memory device such as an (E)EPROM or a flash memory device, which may take the form of, e.g., a memory card or a solid-state disk. In some embodiments, the memory device may include a mass storage device having mechanical components, like a hard disk. The memory device can store a program for execution by the processor. A non-volatile memory device may also be called a non-volatile computer-readable medium.

A "program" is a collection of instructions that can be executed by processor to perform a specific task.

A process 30 and system 10 is provided for assessing the quality of characterization data and generating a confidence level for a predicted ΔE and for indicating a best candidate formula for formulation. Referring to FIG. 1, the system 10 comprises color formulation software 12 operating on a general-purpose computer or computer server. The color formulation software 12 comprises a Characterization Data Engine 14 and a Color Formulation Engine 16. Characterization Data 20 for an EFX Collection is provided to the Characterization Data Engine 14. The Characterization Data 20 may be obtained as described above. A Target Color 22 is also provided to the Color Formulation Engine 16.

Figure 2:
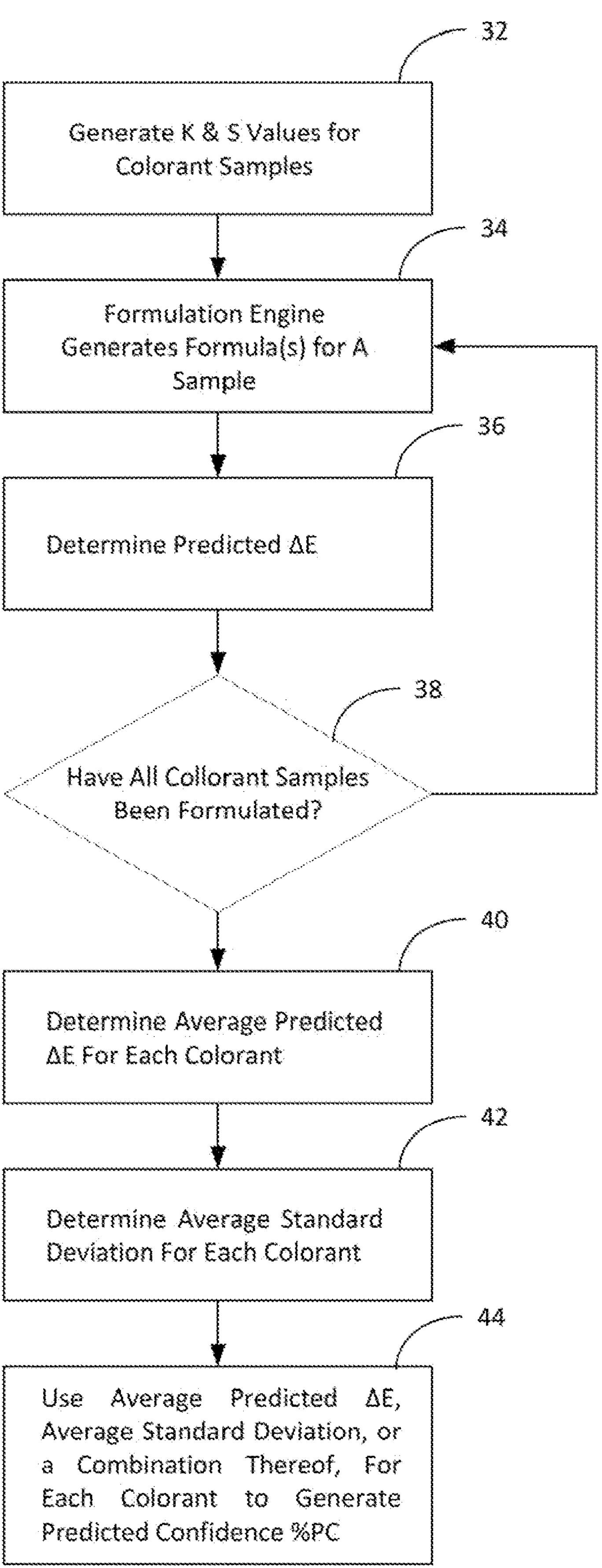
FIG. 2 is a flow chart of a method according to another aspect of the present invention.

Referring to the process 30 of FIG. 2, in step 32, the Characterization Data Engine 14 uses the Characterization Data 20 to generate K and S (absorption and scatter) values for the entire EFX Collection that is to be used within the Color Formulation Engine 16. Each calibration level/sample within that EFX Collection of Characterization Data is then passed through the Color Formulation Engine and in step 34 the Color Formulation Engine 16 generates color formulas. The system 10 compares the predicted spectral curve of the generated formulas to the actual spectral curve of the individual calibration sample, and a predicted delta E is calculated in step 36. An example is provided in Table 1 in FIG. 3. In Table 1, measurements and characterizations from eleven calibration samples are provided. The concentrations range from 1.0000% to 18.0000%. Delta E is determined for each calibration sample as set forth above, along with additional appearance characteristics.

In steps 34, 36 and 38 predicted delta E (pΔE) is then calculated for all samples for a given colorant. In step 40 an average pΔE for a colorant is calculated by averaging the pΔE for all of the individual samples for that colorant. In the example of Table 1, the average pΔE is 0.28. A predicted delta E may also be calculated for the entire EFX Collection (the average of all samples for that collection). The average pΔE value of each colorant provides an indication of how good the colorant characterization set is (in terms of confidence that it represented the colorants behavior across all concentration ranges and mixes).

While pΔE may be used to indicate a confidence level in a formula, the "variation" between predicted/actual samples can be misleadingly small if the user prepares only a few samples to characterize the colorant. To compensate for this and to provide a more accurate indication of variability, the system 10 calculates the average standard deviation (pSD)

for each colorant at each wavelength of the calculated calibration data, such as the predicted spectral curves. As used herein, both pΔE and pSD may be referred to as a Colorant Figure of Merit.

In use, a Target Color 22 is provided to the Color Formulation Engine 16. The Color Formulation Engine accesses the Characterization Data Engine 14 and generates one or more candidate formulas to reproduce the target color, along with a predicted ΔE. As described in more detail below, the Color Formulation Engine 16 also generates a confidence value for the predicted ΔE.

The system 10 uses each colorant's Colorant Figure of Merit, such as the average predicted pSD value, pΔE value, or a combination thereof, to calculate a Predicted Confidence value "%PC" in a specific formula in step 44. This may be expressed as a percent from 0 to 100, but typically within a range of 10-90. For example, a 10% PC would be very low Predicted Confidence and a 90% PC would be very high Predicted Confidence. In one example, pSD and pΔE values for each colorant are weighted in proportion to the concentrations of colorants in a color formula. In this way, characterization data quality for colorants used in low concentrations will not unduly influence the Predicted Confidence.

For example, a weighted pΔE for a candidate formula may be calculated by determining the percentage of each colorant in a formula, multiplying each colorant's pΔE by its percentage in the formula to obtain a weighted pΔE for each colorant, summing the weighted pΔEs. The sum of the weighted pΔEs may then be divided by a maximum pΔE and multiplied by 100 to obtain a percentage confidence.

In another example, a weighted pSD for a candidate formula may be calculated by determining the percentage of each colorant in a formula, multiplying each colorant's pSD by its percentage in the formula to obtain a weighted pSD for each colorant, summing the weighted pSDs. The sum of the weighted pSDs may then be divided by a maximum pSD and multiplied by 100 to obtain a percentage confidence.

The color formulation engine may generate several formulas with a pΔE within a specified tolerance. For example, a user may specify a ΔE tolerance of 2.0. The Color Formulation Engine 16 may generate several candidate formulas within that tolerance. By quantifying a measure of confidence in a candidate formula, and providing the ability to rank multiple predicted formulas for a match according to each formulas based at least in part on predicted confidence, gives the user a tool to select which candidate formulas to prepare for evaluation. In some embodiments, the system 10 ranks the candidate formulas and displays them on a display.

According to one aspect of the present invention, therefore, a Predicted Confidence value %PC that gives a level of confidence that the actual sample prepared with a given formula will be close to the pΔE value (with a range between 10%-90%) is generated and provided to a user. Example formulas may be displayed to a user on a display 50 as illustrated in FIG. 4. In this example, three candidate formulas for beige are displayed. Formula 5 has a predicted color difference of ΔE2000=0.07, and the Predicted Confidence that the user would be able to get within 0.07 with an actual sample preparation using this formula is about 70%. This provides fairly high confidence that if formulated, actual results would be close to the pΔE of 0.07. If the %PC is low (less than 50%), it is an indication that their reproducibility of the colorants used to make this formula as determined by the characterization data of the included colorants is not ideal or does not have enough samples to do a good job of characterizing that colorant.

For example, Formula 4 has a predicted ΔE2000 of 0.05, which is closer to target than Formula 5 or Formula 6. However, Formula 4 also has a %PC of 34, predicting low confidence in the ΔE value. Formula 6 has the highest %PC at 71. However, Formula 6 has a predicted ΔE2000 of 0.10, the farthest from target color. Accordingly, Formula 5 is indicated as the better formula, followed by Formula 6 and then Formula 4. This is an example of taking into account both pΔE and %PC, because Formula 5 is ranked on top, despite having neither the best pΔE nor the best %PC. Additional predicted appearance attributes may also be taken into account. As shown in FIG. 4, formula ranking may be indicated by the order in which the system displays candidate formulas.

The above example is made with respect to polymer formulas and formulations. In the example of FIG. 4, the base material is General Purpose Polystyrene (GPPS), and the colorants are added at various proportions to the weight of the formula as a whole. However, the invention is not limited to polymers or plastics. The invention may also be applied to graphic arts (e.g., printing), whether on paper or other substrates, architectural paints and coatings, ceramic tiles, automotive coatings, other coatings and paints, durable goods, or any application where a colored product is made from constituent colorants and base materials, or inks/colorants and printing substrates.

In a printing example, colors may be produced either as process colors (i.e., a combination of cyan, magenta, yellow, and black), extended gamut process colors (CMYK plus orange, green and violet) or spot colors. Each may have a variety of combinations of ink or colorants to produce a desired target color on a given substrate. Printing techniques may be used on a variety of substrates, including paper, plastic film, metal, and textiles (e.g., dye sublimation printing). These substrates may also affect pΔE and %PC. The present invention can be used to rank the many potential formulas to obtain best results in matching the target color.

In an automotive paint example, an automotive repair or refinishing job may require matching a paint coating on a damaged vehicle. Paint formulation engines often begin with a reference recipe based on a paint code or vehicle identification number. However, even for a given paint code, small variations in appearance exist from batch to batch of paint used during manufacturing, and from location to location because of different source base components and colorants. Paints may also change appearance with age and with exposure to the elements. Also, automotive coatings often have varying appearance properties with illumination angle and viewing angles. Accordingly, a target color's appearance properties are often obtained by measuring an undamaged portion of the damaged vehicle with a multi-angle spectrophotometer. The present invention may be extended to determining pΔE and %PC at multiple illumination angles and/or viewing angles.

Embodiments within the scope of the present disclosure include physical and other computer-readable media for carrying or storing computer-executable instructions and/or data structures. In particular, one or more of the processes or methods described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes or methods, including one or more of the processes or methods described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A digital communication interface, or network, is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface card or module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

In one embodiment, a system for determining a color formula for a target color comprises a computing device having non-volatile instructions that, when executed by a processor, cause the computing device to: generate a plurality of candidate color formulas to reproduce the target color; for each candidate formula, determine a predicted delta E indicating a difference from a predicted color for the candidate formula from the target color; for each candidate formula, generate a confidence value in the predicted delta E by summing, for each colorant in the candidate formula, a weighted average of standard deviation (pSD) of the colorant's predicted spectral response relative to spectral measurements of a plurality of samples of the colorant, where the samples are prepared at different colorant concentrations, wherein the weighting of the figures of merit represents each colorant's proportion in the candidate formula; and indicating to a user a formula based on the predicted delta E and confidence value.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer implemented method of determining a color formula for a target color, comprising:

generating a plurality of candidate color formulas to reproduce the target color by a color formulation engine;

for each candidate formula, determining a predicted delta E indicating a difference from a predicted color for the candidate formula from the target color;

for each candidate formula, the color formulation engine generating a confidence value in the predicted delta E by summing weighted figures of merit for each colorant in the candidate formula, wherein the weighting of the figures of merit represents each colorant's proportion in the candidate formula; and ranking candidate formulas based on the predicted delta E and confidence value;

wherein the figure of merit for each colorant comprises an average standard deviation (PSD) of the colorant's predicted spectral response relative to spectral measurements of a plurality of samples of the colorant, where the samples are prepared at different colorant concentrations.

2. The method of claim 1, wherein the pSD for each colorant is obtained by:

obtaining spectral measurements for a plurality of samples made with the colorant at different colorant concentrations;

generating a plurality of formulas by generating at least one formulation to match the spectral measurement of each sample;

generating a predicted spectral response for each formula; and determining an average standard deviation between the predicted spectral responses of the formulas and the spectral measurements of the samples.

3. The method of claim 2, wherein the color formulation engine generates the confidence value by:

determining a percentage of each colorant in the candidate formula;

multiplying each colorant's pSD by its percentage in the candidate formula to obtain a weighted pSD for each colorant;

summing the weighted pSDs; and expressing the sum of the weighted pSDs as a percentage confidence.

4. The method of claim 1, wherein the target color is defined in terms of a multi-dimensional color space.

5. The method of claim 1, wherein the figure of merit further comprises an average delta E (pΔE) of a colorant's predicted color relative to spectral measurements of the colorant's samples.

6. The method of claim 1, further comprising indicating a best candidate color formula.

7. The method of claim 1, wherein the predicted delta E and confidence value comprises a plurality of predicted delta E and confidence values determined at a plurality of illumination or viewing angles.

8. A system for determining a color formula to match a target color, comprising a computing device having non-volatile instructions that, when executed by a processor, cause the computing device to:

generate a plurality of candidate color formulas to reproduce the target color;

for each candidate formula, determine a predicted delta E indicating a difference from a predicted color for the candidate formula from the target color;

for each candidate formula, generate a confidence value in the predicted delta E by summing weighted figures of merit for each colorant in the candidate formula, wherein the weighting of the figures of merit represents each colorant's proportion in the candidate formula; and indicate a formula to use based on the predicted delta E and confidence value;

wherein the figure of merit for each colorant comprises an average standard deviation (PSD) of the colorant's predicted spectral response relative to spectral measurements of a plurality of samples of the colorant, where the samples are prepared at different colorant concentrations.

9. The system of claim 8, wherein the pSD for each colorant is obtained by:

obtaining spectral measurements for a plurality of samples made with the colorant at different colorant concentrations;

generating a plurality of formulas by generating at least one formula to match the spectral measurement of each sample;

generating a predicted spectral response for each formula; and determining an average standard deviation between the predicted spectral responses of the formulas and the spectral measurements of the samples.

10. The system of claim 9, wherein the confidence value is generated by:

determining a percentage of each colorant in the candidate formula;

multiplying each colorant's pSD by its percentage in the candidate formula to obtain a weighted pSD for each colorant;

summing the weighted pSDs; and expressing the sum of the weighted pSDs as a percentage confidence.

11. The system of any of claim 8, wherein the target color is defined in terms of a multi-dimensional color space.

12. The system of claim 8, wherein the figure of merit further comprises an average delta E (pΔE) of a colorant's predicted color relative to spectral measurements of the colorant's samples.

13. The system of claim 8, wherein the wherein the predicted delta E and confidence value comprises a plurality of predicted delta E and confidence values determined at a plurality of illumination or viewing angles.

14. A computer implemented method of determining a color formula for a target color, comprising:

generating a plurality of candidate color formulas to reproduce the target color by a color formulation engine;

for each candidate formula, determining a predicted delta E indicating a difference from a predicted color for the candidate formula from the target color;

for each candidate formula, the color formulation engine generating a confidence value in the predicted delta E by summing weighted figures of merit for each colorant in the candidate formula, wherein the weighting of the figures of merit represents each colorant's proportion in the candidate formula as generated by the color formulation engine; and ranking candidate formulas based on the predicted delta E and confidence value;

wherein the figure of merit comprises an average delta E (p$\Delta$E) of a colorant's predicted color relative to spectral measurements of the colorant's samples.

* * * * *